(12) United States Patent
Bihel (10) Patent No.: US 9,950,783 B2
(45) Date of Patent: Apr. 24, 2018

(54) BALL-BEARING CONTROL CABLE, A MECHANICAL SYSTEM, AND AN AIRCRAFT

(71) Applicant: AIRBUS HELICOPTERS, Marignane (FR)

(72) Inventor: Jean-Romain Bihel, Le Rove (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 15/257,172

(22) Filed: Sep. 6, 2016

(65) Prior Publication Data

US 2017/0066526 A1 Mar. 9, 2017

(30) Foreign Application Priority Data

Sep. 7, 2015 (FR) ...................... 15 01841

(51) Int. Cl.
| | |
|---|---|
| *F16C 1/20* | (2006.01) |
| *F16C 1/28* | (2006.01) |
| *B64C 13/30* | (2006.01) |
| *F16C 1/22* | (2006.01) |
| *F16C 1/26* | (2006.01) |

(52) U.S. Cl.
CPC ............... *B64C 13/30* (2013.01); *F16C 1/20* (2013.01); *F16C 1/226* (2013.01); *F16C 1/262* (2013.01); *F16C 1/28* (2013.01); *F16C 2326/43* (2013.01)

(58) Field of Classification Search
CPC ...... F16C 1/16; F16C 1/20; F16C 1/22; F16C 1/223; F16C 1/226; F16C 1/26; F16C 1/262; F16C 1/28; F16C 2326/43; B64C 13/30
See application file for complete search history.

(56) References Cited

U.S. PATENT DOCUMENTS

| | | | |
|---|---|---|---|
| 2,369,332 A | | 2/1945 | Batterson et al. |
| 2,372,204 A | * | 3/1945 | Herkert ............... F16C 1/20 74/502.3 |

(Continued)

FOREIGN PATENT DOCUMENTS

| | | |
|---|---|---|
| DE | 1525215 | 9/1969 |
| DE | 3608858 | 11/1971 |

(Continued)

OTHER PUBLICATIONS

French Search Report for French Application No. 1501841, Completed by the French Patent Office on Apr. 13, 2016, 6 pages.

*Primary Examiner* — Adam D Rogers
(74) *Attorney, Agent, or Firm* — Brooks Kushman P.C.

(57) ABSTRACT

A ball-bearing control cable comprising an outer sheath surrounding a central blade. The outer sheath comprises a central portion extending between two endpieces. Each endpiece comprises a tubular central body that surrounds the central blade, each central body extending from a proximal abutment secured to the central portion towards a free distal abutment, each abutment of an endpiece projecting from the central body of the endpiece, each endpiece including a resilient system interposed around the central body of the endpiece between an abutment of the endpiece and a ring, the resilient system of one endpiece being arranged between the distal abutment and the ring of the endpiece, and the resilient system of the other endpiece being arranged between the proximal abutment and the ring of the other endpiece.

14 Claims, 3 Drawing Sheets

(56) References Cited

U.S. PATENT DOCUMENTS

| | | | | |
|---|---|---|---|---|
| 2,442,360 A * | 6/1948 | Herkert | ................... | F16C 1/20 74/502.3 |
| 3,217,557 A * | 11/1965 | Martinot | ................... | F16C 1/20 74/502.3 |
| 3,362,249 A | 1/1968 | Richoux | | |
| 3,436,130 A * | 4/1969 | Grebert | ................... | F16C 1/20 384/49 |
| 3,464,287 A | 9/1969 | McCabe | | |
| 3,509,782 A * | 5/1970 | Molnar | ................... | F16C 1/20 74/502.3 |
| 3,631,731 A * | 1/1972 | Hawtree | ................... | F16C 1/20 29/898.03 |
| 3,945,268 A * | 3/1976 | Ion | ................... | F16C 1/20 464/174 |
| 3,990,321 A * | 11/1976 | Hurlow | ................... | F16C 1/20 74/500.5 |
| 4,188,835 A * | 2/1980 | Ion | ................... | F16C 1/20 464/174 |
| 4,690,014 A * | 9/1987 | Richoux | ................... | F16C 1/20 74/502 |
| 4,787,264 A * | 11/1988 | Tamarin | ................... | F16C 1/28 74/502.3 |
| 5,220,850 A * | 6/1993 | Fawcett | ................... | F16C 1/20 74/502.3 |
| 5,722,301 A | 3/1998 | Schaaphok | | |

FOREIGN PATENT DOCUMENTS

| | | | | |
|---|---|---|---|---|
| DE | 4000478 C1 * | 6/1991 | ........... | B62D 7/1536 |
| EP | 0207824 A1 * | 1/1987 | ................. | F16C 1/20 |
| EP | 3933541 | 8/1999 | | |
| FR | 360475 | 4/1906 | | |
| FR | 366246 | 9/1906 | | |
| FR | 1403706 | 6/1965 | | |
| FR | 2508197 | 12/1982 | | |
| FR | 2576070 | 7/1986 | | |
| FR | 2651026 A1 * | 2/1991 | ................. | F16C 1/20 |
| GB | 1080156 | 8/1967 | | |

* cited by examiner

BALL-BEARING CONTROL CABLE, A MECHANICAL SYSTEM, AND AN AIRCRAFT

CROSS REFERENCE TO RELATED APPLICATION

This application claims priority to French patent application No. FR 15 01841 filed on Sep. 7, 2015, the disclosure of which is incorporated in its entirety by reference herein.

BACKGROUND OF THE INVENTION (1) Field of the Invention

The present invention relates to a ball-bearing control cable, to a mechanical system provided with such a ball-bearing control cable, and to an aircraft including such a mechanical system.

The invention thus lies in the technical field of ball-bearing control cables. Such a ball-bearing control cable is also called a "ball-bearing sheath" or a "ball-bearing control" by the person skilled in the art.

(2) Description of Related Art

A mechanical system may comprise a ball-bearing control cable for transmitting traction or compression forces.

By way of example, aircraft sometimes have ball-bearing control cables in a movement transmission linkage for controlling a flight control member of the aircraft. By way of illustrative example, a helicopter may have servo-controls for controlling the pitch of the blades of the lift and propulsion rotor of the helicopter. Those servo-controls are thus controlled by movement transmission linkages that are connected to a stick referred to as the "cyclical" stick and to a lever referred to as the "collective pitch" lever. Those movement transmission linkages may thus comprise ball-bearing control cables.

A ball-bearing control cable usually comprises a movable central blade that is guided axially by balls inside an outer sheath, while enabling the central blade and the outer sheath to follow sinuous paths.

The central blade extends longitudinally between two end members that are to be connected together mechanically in order to transmit traction or compression forces from one member to the other member. Thus, the central blade extends longitudinally from a first end secured to a first end member to a second end secured to a second end member.

Furthermore, the central blade passes through the inside of the outer sheath in order to be connected to the first end member and to the second end member. By way of example, this outer sheath comprises a flexible metal tube made of metal and covered with a protection tube made of plastics material.

In addition, the central blade is movable relative to the outer sheath, while being guided axially by balls. Under such circumstances, the ball-bearing control cable comprises two rows of balls arranged in the outer sheath on either side of the central blade. Each row of balls usually has an elongate structure defining cages, each ball being arranged in a cage.

As a result, a first row of balls is arranged in the outer sheath between a top face of the central blade and a top plate. A second row of balls is arranged in the outer sheath between a bottom face of the central blade and a bottom plate. Furthermore, the balls can roll in grooves made in the bottom face and the top face of the central blade.

In addition, the ball-bearing control cable may include an endpiece interposed between the outer sheath and the central blade, in particular in order to keep the balls inside the outer sheath.

According to Document U.S. Pat. No. 5,722,301, such an endpiece comprises a tube extending the outer sheath. That tube extends longitudinally from the outer sheath towards a dropped edge clamped on a pipe. That pipe is disposed about one end of the central blade.

In addition, a ring arranged in the tube of the endpiece surrounds the central blade and blocks the rows of balls in longitudinal translation.

Such a ball-bearing control cable is sufficiently rigid longitudinally to allow a traction force or a compression force to be transmitted from one end member to another end member. In addition, the ball-bearing control cable presents transverse flexibility that is sufficient for following a sinuous path.

In this context, ball-bearing control cables are used in particular on a helicopter instead of rigid control rods. In particular, the ball-bearing control cables are sometimes interposed in a movement transmission linkage in order to control a hydraulic system and in particular a servo-control. Moving a flight control thus leads to a central blade of a ball-bearing control cable moving, with that movement of the central blade leading to the servo-control being operated.

Those ball-bearing control cables are nevertheless at risk of being subjected to destructive forces in the event of a member of the movement transmission linkage being prevented from moving. By way of example, an input lever of a servo-control may be prevented from moving in the absence of hydraulic assistance. The movement of a flight control thus leads to a traction or compression force being created that acts on the central blade. That force can generate a force in the outer sheath that might deteriorate said outer sheath.

Document FR 1 403 706 is remote from that problem. Document FR 1 403 706 describes a cage for spacing apart a rolling body.

Document FR 2 576 070 presents a ball-bearing control cable.

Documents FR 2 508 197, FR 366 246, DE 1 525 215, U.S. Pat. Nos. 2,369,332, 3,464,287, EP 0 933 541, FR 360 475, and DE 6 608 858 are also known.

BRIEF SUMMARY OF THE INVENTION

An object of the present invention is thus to provide an alternative ball-bearing control cable in order to tend to increase the lifetime of an outer sheath in the event of extreme stress of the central blade.

According to the invention, a ball-bearing control cable comprises an outer sheath surrounding a central blade that is movable longitudinally relative to the outer sheath, the central blade being arranged between two rows of bearing members, each row of bearing members being arranged between a face of the central blade and a plate facing an inside face of the outer sheath. The outer sheath comprises a central portion extending between two endpieces, and in particular between an endpiece referred to as the "first" endpiece and an endpiece referred to as the "second" endpiece.

Furthermore, each endpiece comprises a hollow central body that surrounds the central blade, each central body extending longitudinally along at least one abutment referred to as the "proximal" abutment towards a free abutment referred to as the "distal" abutment, each abutment of an endpiece projecting from the central body of the endpiece towards an external medium outside the ball-bearing control cable, each endpiece including a resilient system interposed around the central body of the endpiece between an abutment of the endpiece and a ring, each ring being arranged around the central body of the endpiece associated therewith, each endpiece being movable in translation relative to the ring surrounding said endpiece, the resilient system of one endpiece being arranged between the distal abutment and the ring of the endpiece, and the resilient system of the other endpiece being arranged between the proximal abutment and the ring of the other endpiece.

The term "longitudinally" refers to the line along which the central blade extends in order to pass through the outer sheath. The term "transversely" is used below to refer to a direction that is perpendicular to that line. For a cylindrical outer sheath, the term "longitudinal" refers to the axis of symmetry of the outer sheath, and the term "transversely" refers to radii of the outer sheath.

The expression "central body extending longitudinally along at least one abutment referred to as the "proximal" abutment towards an abutment referred to as the free "distal" abutment" means that the central body extends at least between the abutments, the central body can also extend longitudinally beyond the abutments.

Furthermore, the rings are suitable for being attached to a structure. By way of example, the rings may be hinged to said structure.

As a result, the outer sheath comprises a central portion abutted to two endpieces. By way of example, these endpieces are crimped onto the central portion.

Furthermore, each resilient system tends to leave an endpiece with freedom to move relative to a ring.

Under such circumstances, and on leaving an equilibrium position, each endpiece can slide in at least one direction relative to the ring placed about the central body of the endpiece. On leaving an equilibrium position, the direction of sliding of an endpiece relative to a ring is in addition by construction substantially opposite or else similar to the direction of sliding of the other endpiece depending on the embodiment and on the malfunction observed. The two endpieces are therefore suitable for sliding relative to a ring respectively in two opposite directions.

Consequently, the invention provides a simple solution that is particularly adapted to the flight controls of a helicopter that can be subjected to the possibility of hydraulic assistance being stopped and of control forces being considerable.

The endpieces make it possible to provide flexibility to the outer sheath so as to enable it to move additionally in the event of extreme stress.

If the central blade is deformed under a traction or compression force, e.g. following a hydraulic failure, the endpieces provide freedom of movement to the outer sheath. In particular, when the central blade is subjected to a traction force, the outer sheath may move in translation relative to a ring by compressing the resilient system bearing against said ring. When the central blade is subjected on the contrary to a compression force, the outer sheath may move in translation relative to the other ring by compressing the resilient system bearing against said other ring.

This freedom of movement of the outer sheath thus tends to reduce the forces exerted on the outer sheath in order to optimize its lifetime.

The ball-bearing control cable may further comprise one or more of the following additional characteristics.

Thus, each row of bearing members may extend between the first endpiece and the second endpiece.

In addition, each plate may extend between the first endpiece and the second endpiece.

The two endpieces make it possible to hold the plates and/or the rows of bearing members in place inside the outer sheath.

In addition, at least one ring may be a ring having a spherical bearing surface of a ball joint. The ring is thus arranged in a spherical outer cage that is secured to a carrier structure.

Such a ring thus presents three degrees of freedom in rotation.

In another aspect, the expression "resilient system" designates a system that deforms elastically while tending to return to an equilibrium position following deformation.

In a first embodiment, one of the resilient systems comprises a resilient member extending between an abutment of an endpiece and the ring surrounding said endpiece.

The expression "resilient member" designates a spring or a block of resilient material, such as a cylinder made of elastomer.

In a second embodiment, the resilient system comprises a resilient box.

Under such circumstances, at least one ring comprises a jaw provided with a stop surface referred to as the "distal" stop surface and with a stop surface referred to as the "proximal" stop surface, and at least one of said resilient systems comprises an inner resilient member as well as an outer resilient member and a slide, said inner resilient member and said outer resilient member extending from said slide in the same direction, said inner resilient member extending between the slide and an abutment of an endpiece and said outer resilient member extending between said slide and a stop surface of a jaw.

The inner resilient member and the outer resilient member may be in the form of a spring or of a block of resilient material.

This second embodiment tends not only to protect the sheath in the event of a mechanical part connected to the ball-bearing control cable being blocked, but also tends to enable the ball-bearing control cable to operate in the event of the inside bearing members of the ball-bearing control cable becoming jammed.

In the event of a mechanical part connected to the control being blocked, the endpieces move in opposite directions.

However, in the event of the bearing members inside the ball-bearing control cable becoming jammed, the endpieces move in similar directions.

By way of example, an inner resilient member referred to as the "first" inner resilient member extends between a slide referred to as the "first" slide and the distal abutment of the first endpiece in order to tend to push the first slide against the proximal abutment of the first endpiece, an outer resilient member referred to as the "first" outer resilient member extending between said first slide and a distal stop surface of a jaw referred to as the "first" jaw in order to tend to push the first slide against the proximal stop surface of the first jaw.

In addition, an inner resilient member referred to as the "second" inner resilient member extends between a slide referred to as the "second" slide and the proximal abutment of the second endpiece in order to tend to push the second slide against the distal abutment of the second endpiece, an outer resilient member referred to as the "second" outer resilient member extending between said second slide and a proximal stop surface of a jaw referred to as the "second"

jaw in order to tend to push the second slide against the distal stop surface of the second jaw.

In addition, and by way of example, said central portion is flexible, each central body being rigid.

The stiffness of the central portion and of the central bodies are thus defined by relative characteristics. The central portion is flexible in the sense that this central portion can twist when a force is applied to the central blade. However, the central bodies are rigid and do not twist.

In addition, the central blade may present an intermediate segment extending in thickness from a top face facing a first row of bearing members towards a bottom face facing the other row of bearing members, said intermediate segment presenting a first thickness between said bottom face and said top face, said intermediate segment extending between two end segments of the central blade, each end segment presenting a second thickness that is greater than the first thickness.

This characteristic promotes deformation of the central blade between the end segments when a force is applied to said blade in traction or in compression.

Possibly, each end segment projects beyond an endpiece.

In addition, each central body comprises a cylinder extending in thickness from an inside face directed towards the central blade towards an outside face, the outside face describes a circle presenting a diameter referred to as the "central" diameter, at least one abutment comprises an annulus inscribed within a circle presenting a diameter referred to as the "outside" diameter, said outside diameter being greater than the central diameter.

Each abutment thus projects radially from the corresponding central body.

In addition to a ball-bearing control cable, the invention also provides a mechanical system provided with a ball-bearing control cable that is interposed between a first section and a second section of a movement transmission linkage.

The ball-bearing control cable is of the above-described type, the free distal abutment of an endpiece facing the first section and said free distal abutment of the second endpiece facing the second section, the central blade being secured to the first section and to the second section.

The expression "mechanical system" designates a system that is mechanical at least in part. By way of example, the mechanical system may include electrical, pneumatic, or hydraulic members in the first section and/or in the second section.

The first section may be a driving section transmitting movements to the second section through the ball-bearing control cable. In alternative manner, the second section may be a driving section transmitting movements to the first section through the ball-bearing control cable.

In addition, and by way of example, no endpiece is in contact with the first section or the second section. The space separating an endpiece from the first section or from the second section of the movement transmission linkage makes it possible for the endpiece to move, if necessary.

Finally, the invention provides an aircraft including such a mechanical system.

BRIEF DESCRIPTION OF THE SEVERAL VIEWS OF THE DRAWINGS

The invention and its advantages appear in greater detail in the context of the following description of example embodiments given by way of non-limiting illustration and with reference to the accompanying figures, in which.

Elements present in more than one of the figures are given the same references in each of them.

DETAILED DESCRIPTION OF THE INVENTION

Figure 1:
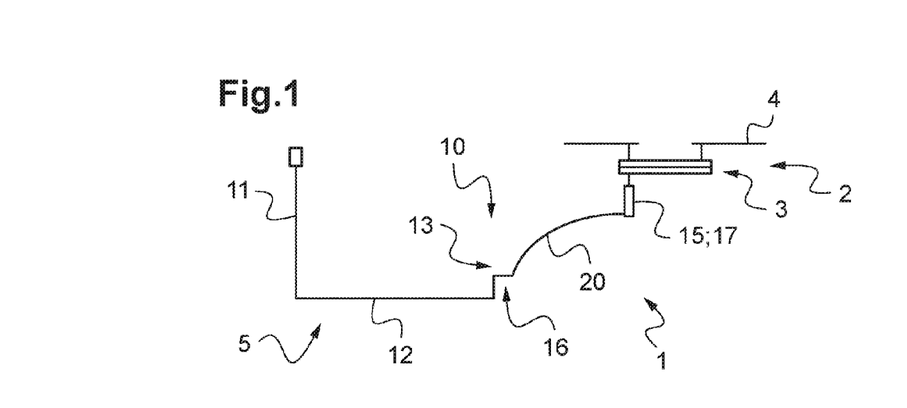
FIG. 1 is a diagram representing an aircraft of the invention.

FIG. 1 presents an aircraft 1 of the invention.

In particular, this aircraft 1 comprises a rotor 2 contributing at least in part to the lift and/or to the propulsion of said aircraft. Such a rotor 2 may have a plurality of variable pitch blades 4. Under such circumstances, the rotor 2 also has a set of swash plates 3 suitable for controlling the pitch of the blades.

In addition, the aircraft 1 includes a mechanical system 5 of the invention.

This mechanical system 5 is thus provided with a ball-bearing control cable 20 of the invention. The ball-bearing control cable 20 is arranged between a first section 16 and a second section 17 of a movement transmission linkage 10.

By way of non-exclusive example, the first section 16 is an upstream section transmitting a movement to the ball-bearing control cable 20. The second section 17 is thus a downstream section moved by the ball-bearing control cable 20.

In addition, the mechanical system 5 may be a system that serves to control the pitch of the blades 4 of the rotor 2. Under such circumstances, the movement transmission linkage 10 may comprise at least one control means 11, at least one rod 12, at least one ball-bearing control cable 20, at least one return means 13, and a servo-control 15 connected to the set of control plates 3.

In the example of FIG. 1, a ball-bearing control cable 20 is connected to a first section 16 comprising in succession one control means 11, one rod 12, one return means 13. The ball-bearing control cable is thus fastened to the return means 13.

In addition, the ball-bearing control cable 20 is connected to a second section 17 including the servo-control 15. By way of example, the ball-bearing control cable is fastened to a control lever of a hydraulic valve of the servo-control 15.

Naturally, other embodiments could be envisaged. By way of example, a ball-bearing control cable may be connected to an engine controlled by electric flight controls, and having two rods, two return means, etc.

Figure 2:
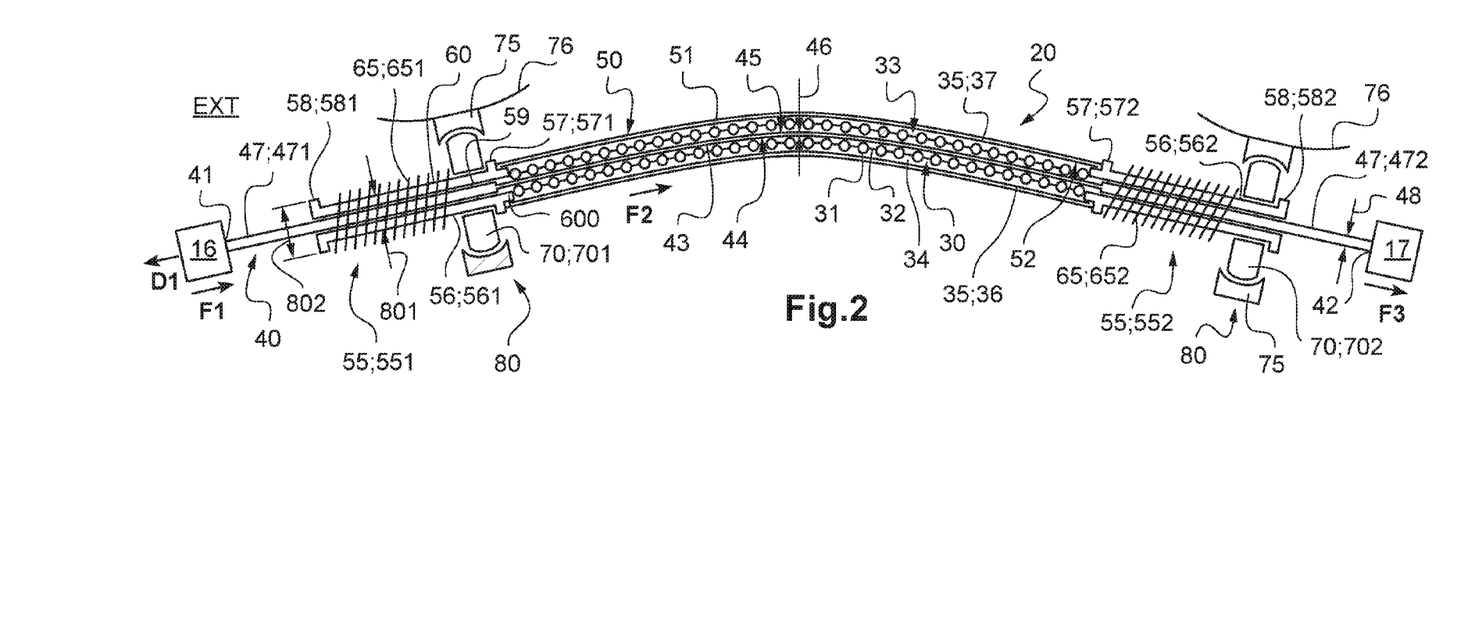
FIG. 2 is a diagram showing a ball-bearing control cable in a first embodiment of the invention.

Whatever the embodiment of the invention, and with reference to FIG. 2, a ball-bearing control cable 20 comprises a hollow outer sheath 50. This outer sheath is provided with a tubular central portion 51.

Such a central portion 51 may comprise different layers. By way of example, the central portion comprises a flexible metal tube covered in a protection tube made of plastics material.

In addition, the outer sheath 50 includes two hollow endpieces 55 placed longitudinally on either side of the central portion 51. The outer sheath 50 thus comprises longitudinally and in succession: an endpiece 55 referred to as the "first" endpiece 551; a central portion 51; and an endpiece 55 referred to as the "second" endpiece 552. The first endpiece 551 and the second endpiece 552 are secured to the central portion 51, for example by being crimped to said central portion.

Each endpiece 55 comprises a tubular central body 56. Each central body 56 extends longitudinally at least from one abutment 57 referred to as the "proximal" abutment 571, 572 towards an abutment 58 referred to as the free "distal" abutment 581, 582. The distal abutment is said to be "free" insofar as this distal abutment is arranged at a free end of the central body, by opposition to the end of the central body connected to the central portion of the outer sheath.

The proximal abutment may be secured to the outer sheath. However, in the embodiment of FIG. 2, the proximal abutment is interposed between the central body 56 and a connection tube 600. By way of example, the outer sheath is thus crimped to said connection tube.

The distal abutment, the proximal abutment, the central body and the connection tube may constitute different portions of a one-piece part.

However, the distal abutment, and/or the proximal abutment, and/or the central body and/or the connection tube may constitute different parts fastened to one another.

By way of example, the proximal abutment as well as the connection tube and the central body are component portions of a first mechanical part. The distal abutment thus represents a second mechanical part fastened to the first mechanical part.

In addition, each abutment 57, 58 of an endpiece 55 projects from the central body 56 of this endpiece towards an external medium EXT that is outside the ball-bearing control cable 20. The proximal abutment and the distal abutment of an endpiece represent for example, two shoulders of the central body between which the members may be wedged.

In particular, each abutment may project transversely from the central body.

In the example of FIG. 2, each abutment may project radially from the central body. In this example, each central body 56 comprises a cylinder extending in thickness from an inside face 59 towards an outside face 60. The outside face describes a circle presenting a diameter referred to as a "central" diameter 801. At least one abutment 57, 58 thus takes the form of an annulus inscribed within a circle presenting a diameter referred to as the "outside" diameter, which outside diameter is greater than the central diameter.

In addition, each endpiece 55 includes a resilient system 65 that is arranged about a central body 56 between the proximal abutment 57 and the distal abutment 58 of said endpiece 55. The resilient system 65 may comprise at least one spring.

In addition, each endpiece 55 includes a ring 70 that is arranged around a central body 56 between the proximal abutment 57 and the distal abutment 58 of said endpiece 55. The central body of an endpiece is movable longitudinally in translation relative to an axis of symmetry of the ring 70 of said endpiece. More precisely, the central body is movable along an axis of symmetry of the ring that surrounds said central body.

Such a ring may be a ring having spherical bearing surfaces of a ball joint 80. Under such circumstances, the ring may comprise a ball arranged in an outer cage 75 of the ball joint 80, said cage being secured to a structure 76.

Under such circumstances, each resilient system 65 extends between an abutment of an endpiece and the ring of said endpiece.

More precisely, the resilient system 65 of an endpiece is at least connected to the distal abutment and to the ring of said endpiece, and the resilient system 65 of the other endpiece is at least connected to the proximal abutment and to the ring of said other endpiece.

As a result, the outer sheath comprises an endpiece referred to as the "first" endpiece 551. This first endpiece 551 comprises a central body referred to as the "first" central body 561 carrying a proximal abutment referred to as the "first" proximal abutment 571 and a distal abutment referred to as the "first" distal abutment 581. A resilient system referred to as the "first" resilient system 651 and a ring referred to as the "first" ring 701 surrounding the first central body 561 at least in part.

Furthermore, the outer sheath comprises an endpiece referred to as the "second" endpiece 552. This second endpiece 552 comprises a central body referred to as the "second" central body 562 carrying a proximal abutment referred to as the "second" proximal abutment 572 and a distal abutment referred to as the "second" distal abutment 582. A resilient system referred to as the "second" resilient system 652 and a ring referred to as the "second" ring 702 surrounding the second central body 562 at least in part.

In addition, the ball-bearing control cable comprises a central blade 40 passing through the outer sheath 50.

The central blade 40 extends longitudinally from a first end zone 41 to a second end zone 42. The first end zone 41 projects from the first endpiece 551 of the outer sheath 50 in order to be secured by conventional fastener means to a movable member of the first section 16. In addition, the second end zone 42 projects from the second endpiece 552 of the outer sheath 50 in order to be secured by conventional fastener means to a movable member of the second section 17. Such fastener means may include means for screw-fastening, heat-sealing, adhesively bonding, mechanical assembly, e.g. such as a pin.

The central blade 40 may comprise an intermediate segment 43 extending between two end segments 47. Each end segment 47 embodies an end zone of the central blade 40. Under such circumstances, the central blade 40 comprises longitudinally and in succession: an end segment 47 referred to as the "first" end segment 471 embodying the first end zone 41, the intermediate segment 43, and an end segment referred to as the "second" end segment 472 embodying the second end zone 42.

The intermediate segment 43 further extends in elevation from a top face 45 towards a bottom face 44. Under such circumstances, the intermediate segment 43 presents a thickness referred to as the "first" thickness 46 between the bottom face 44 and the top face 45.

In addition, each end segment 47 of the central blade 40 presents a thickness referred to as the "second" thickness 48 in an elevation direction. The second thickness 48 thus separates in elevation a top face from a bottom face of the end segment.

Consequently, the second thickness 48 of an end segment is advantageously greater than the first thickness 46 of the central segment. This characteristic makes it possible to obtain end segments presenting stiffness that is greater than the stiffness of the central segment.

In addition, the central blade 40 is movable longitudinally relative to the outer sheath 50.

For this reason, the ball-bearing control cable has two rows 30 of bearing members. These two rows 30 are arranged in the central portion 51 of the outer sheath 50. The rows 30 of bearing members are disposed in elevation on either side of the central blade. In addition, the rows 30 of bearing members are disposed longitudinally between the first endpiece 551 and the second endpiece 552.

Each row 30 comprises holder members 32 defining cages, the bearing members being found in these cages. By way of example, such members comprise balls 31.

Consequently, a top row 33 of bearing members is arranged between the top face 45 of the central blade 40 and an inside face 52 of the outer sheath 50. In addition, a bottom row 34 of bearing members is arranged between the bottom face 44 of the central blade 40 and an inside face 52 of the outer sheath 50.

Possibly, the top face and the bottom face of the central blade both present a respective groove, the bearing members lying in these grooves.

In addition, a plate 35 is interposed in elevation between each row 30 of bearing members and the inside face 52 of the outer sheath. In addition, the plates are disposed longitudinally between the first endpiece 551 and the second endpiece 552.

Under such circumstances, a plate 35 referred to as the "top" plate 37 is arranged between the top row 33 of bearing members and the outer sheath. A plate 35 referred to as the "bottom" plate 36 is arranged between the bottom row 34 of bearing members and the outer sheath.

Figure 3:
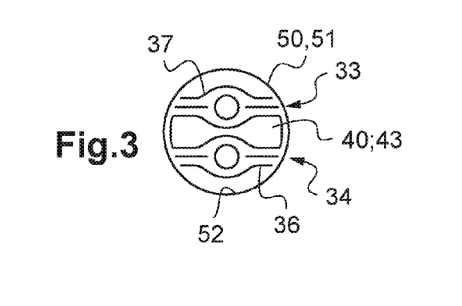
FIG. 3 is a cross section of the ball-bearing control cable of FIG. 2 in a central section.

With reference to FIG. 3, the ball-bearing control cable comprises in succession in elevation and within the central portion 51 of the outer sheath: a bottom plate 36; a bottom row 34 of bearing members; the central blade 40; a top row 33 of bearing members; and a top plate 37.

With reference to FIG. 2, the ball-bearing control cable 20 is thus arranged between a first section 16 and a second section 17 of a movement transmission linkage 10.

The central blade is thus fastened firstly to the first section 16 and secondly to the second section 17.

The first distal abutment 581 of the first endpiece 551 is thus facing the first section 16, this first distal abutment 581 however not being in contact with said first section.

In addition, the free second distal abutment 582 of the second endpiece 552 is facing the second section 17, this second distal abutment 582 however not being in contact with said second section.

Consequently, no endpiece of the outer sheath is in contact with the first section 16 or the second section 17.

In the first embodiment of FIG. 2, each resilient system includes a single resilient member that extends between an abutment of an endpiece and the ring surrounding said endpiece.

Under such circumstances, the first resilient system 651 bears longitudinally against the first distal abutment 581 and the first ring 701 in order to tend to press the first ring 701 against the first proximal abutment 571. The second resilient system 652 bears longitudinally against the second proximal abutment 572 and the second ring 702 in order to tend to press the second ring 702 against the second distal abutment 582. Each resilient system further extends from an abutment in a direction going from the second endpiece to the first endpiece.

Under normal operating conditions, the central blade 40 moves in longitudinal translation relative to the outer sheath 50.

By way of example, movement of the first section 16 along arrow F1 leads to a movement of the same magnitude of the central blade along arrow F2, the central blade leading to a movement of the same magnitude in the second section 17 along arrow F3. The first section, the central blade and the second section may thus move through the same amplitude, and possibly in the same direction or in different directions.

However, in the event of the section controlled by the ball-bearing control cable being blocked, the outer sheath also performs a movement in translation.

Figure 4:
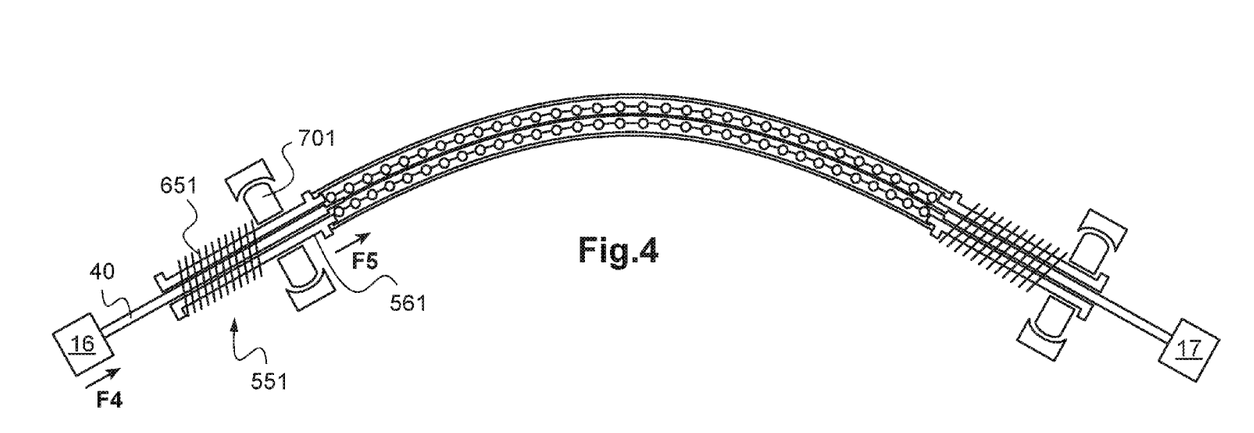
FIGS. 4 to 5 are diagrams showing the operation of the invention in the first embodiment.

With reference to FIG. 4, the first section 16 may require the central blade 40 to move along arrow F4. In the event of the second section 17 being blocked, as shown by a cross, the central blade 40 is subjected to a compression force.

The outer shape of the central blade is thus modified. This modification leads to movement of the outer sheath by means of an endpiece moving relative to the ring of said endpiece.

In particular, force may be applied to the first endpiece 551 as shown in FIG. 4. The first central body 561 thus moves relative to the first ring 701 by compressing the first resilient system 651. This movement of the first central body tends to limit the forces exerted in the central portion 51 of the outer sheath.

Figure 5:
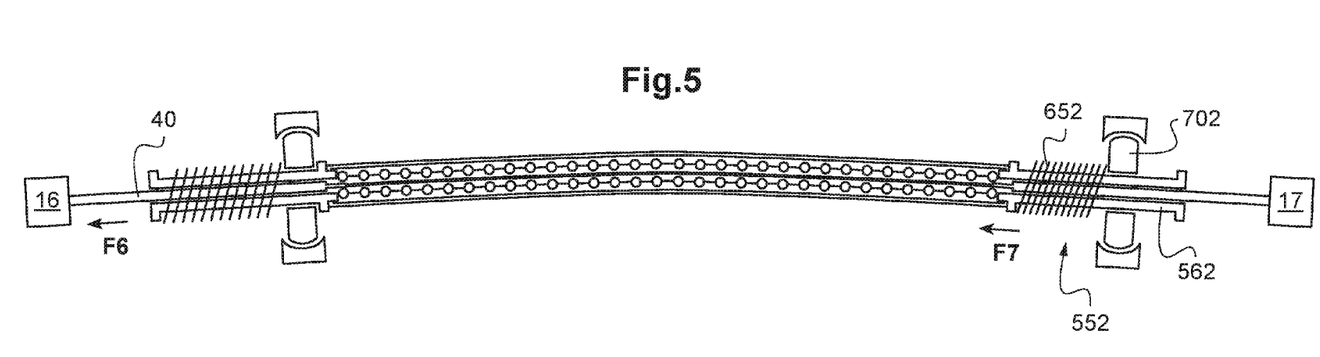

With reference to FIG. 5, the first section 16 may require the central blade 40 to move along arrow F6. In the event of the second section 17 being blocked, as shown by a cross, the central blade 40 is subjected to a traction force.

The central blade is thus deformed. This deformation leads to movement of the outer sheath by means of an endpiece moving relative to the ring of said endpiece.

In particular, force may be applied to the second endpiece 552 as shown in FIG. 5. The second central body 562 thus moves relative to the second ring 702 by compressing the second resilient system 652. This movement of the second central body tends to limit the forces exerted in the central portion 51 of the outer sheath. This movement thus tends to protect the outer sheath if an incident takes place, for example, such as the second section being blocked.

Figure 6:
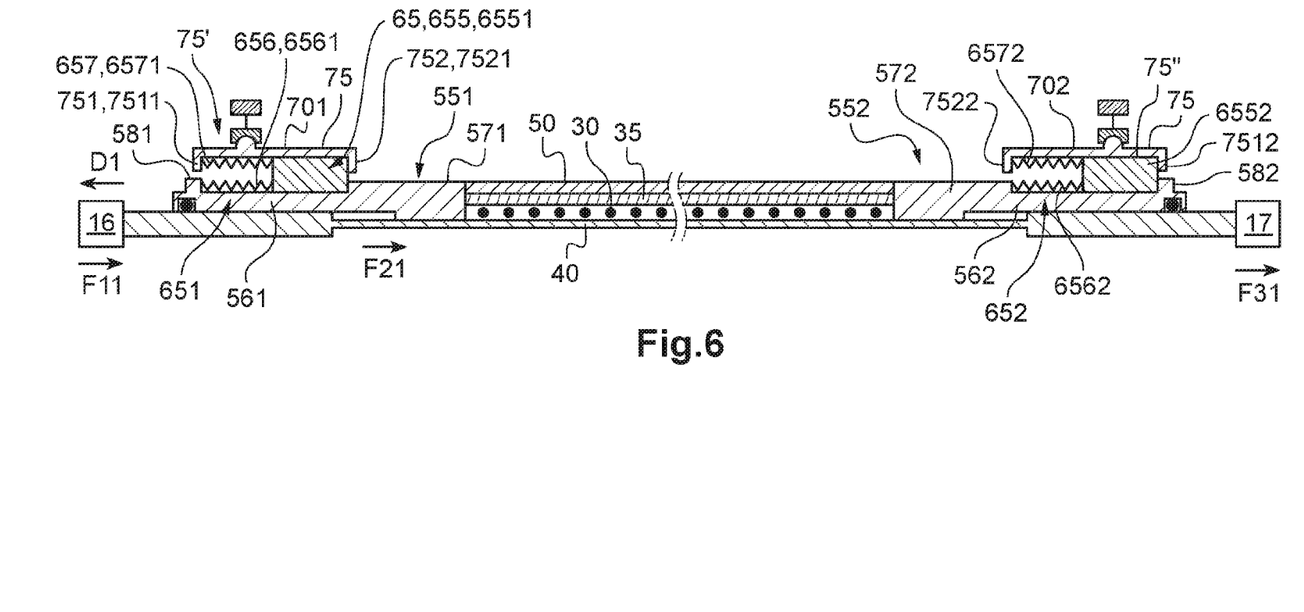
FIG. 6 is a diagram showing a ball-bearing control cable in a second embodiment of the invention.

FIG. 6 shows a second embodiment.

At least one ring comprises a jaw provided with a stop surface referred to as the "distal" stop surface 751 and with a stop surface referred to as the "proximal" stop surface 752. Each stop surface extends transversely from the jaw towards an endpiece without touching said endpiece. In particular, the distal stop surface extends towards the distal abutment of an endpiece, and the proximal stop surface extends towards the proximal abutment of an endpiece.

In addition, the jaw carries a ball suitable for cooperating with a spherical cage.

Under such circumstances, a resilient system 65 comprises an inner resilient member 656 as well as an outer resilient member 657 and a slide 655. The inner resilient member 656 and the outer resilient member 657 each extend from the slide 655 in a same direction D1, for example in a direction going from the second endpiece to the first endpiece. In addition, the inner resilient member 656 extends between the slide 655 and an abutment of the endpiece corresponding thereto, whereas the outer resilient member 657 extends between the slide 655 and a stop surface of a jaw.

As a result, an inner resilient member referred to as the "first" inner resilient member 6561 extends between a slide referred to as the "first" slide 6551 and the distal abutment 581 of the first endpiece in order to tend to push the first slide 6551 against the proximal abutment 571 of the first endpiece 551. An outer resilient member referred to as the "first" outer resilient member 6571 extends between the first slide 6551 and a distal stop surface 7511 of a jaw referred to as the "first" jaw 75' in order to tend to push the first slide 6551 against the proximal stop surface 7521 of the first jaw 75'.

An inner resilient member referred to as the "second" inner resilient member 6562 extends between a slide referred to as the "second" slide 6552 and the proximal abutment 572 of the second endpiece 552 in order to tend to push the second slide 6552 against the distal abutment 582 of the second endpiece 552.

An outer resilient member referred to as the "second" outer resilient member 6572 extends between the second slide 6552 and a proximal stop surface 7522 of a jaw referred to as the "second" jaw 75" in order to tend to push the second slide 6552 against the distal stop surface 7512 of the second jaw 75".

In equilibrium, each proximal stop surface tends to be arranged in register with a proximal abutment, and each distal stop surface tends to be arranged in register with a distal abutment.

Under normal operating conditions, the central blade 40 moves in longitudinal translation relative to the outer sheath 50.

By way of example, movement of the first section 16 along arrow F11 leads to a movement of the same magnitude of the central blade along arrow F21, the central blade leading to a movement of the same magnitude in the second section 17 along arrow F31. The first section, the central blade and the second section may thus move through the same amplitude, and possibly in the same direction or in different directions.

However, in the event of the second section being blocked, the outer sheath also performs a movement in translation.

The outer shape of the central blade is thus modified. This modification leads to movement of the outer sheath by means of at least one endpiece moving relative to the ring of said endpiece.

By way of example, force is applied to the first endpiece 551. The first central body 561 thus moves relative to the first ring 701 and to the first slide by compressing the first inner resilient member 6561. This movement of the first central body tends to limit the forces exerted in the central portion 51 of the outer sheath.

Likewise, force may be applied to the second endpiece 552. The second central body 562 thus moves relative to the second ring 702 and to the second slide by compressing the second inner resilient member 6562 and the second outer resilient member 6572. This movement of the second central body tends to limit the forces exerted in the central portion 51 of the outer sheath.

In addition, the second embodiment may also present the advantage of protecting the control cable in the event of the bearing members jamming.

By way of example, a force may move the central blade 40 to the left in FIG. 6.

The jamming of bearing members tends to lead to a similar movement of the plates 35, of the first endpiece 551, and of the second endpiece 552. This movement is made possible by the compression of the inner and outer first resilient members 6561 and 6571 of the first resilient system 651, and of the outer second resilient member 6572 of the second resilient system 652.

In the event of the central blade 40 moving to the right in FIG. 6, the jamming of bearing members tends to lead to a similar movement of the plates 35, of the first endpiece 551, and of the second endpiece 552. This movement is made possible by the compression of the first inner resilient member 6561 of the first resilient system 651, and of the second inner resilient member 6562 of the second resilient system 652.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A ball-bearing control cable comprising an outer sheath surrounding a central blade that is movable longitudinally relative to the outer sheath, the central blade being arranged between two rows of bearing members, each row of bearing members being arranged between a face of the central blade and an associated plate that is opposite an inside face of the outer sheath, the outer sheath comprising a central portion extending between a first endpiece and a second endpiece, wherein each endpiece comprises a hollow central body that surrounds the central blade, each central body extending longitudinally from at least one proximal abutment towards a free, distal abutment, the at least one proximal abutment and the distal abutment of each of the first and second endpieces projecting from the central body of the associated endpiece towards an external medium that is outside the ball-bearing control cable, each of the first and second endpieces including a resilient system interposed around the central body of the associated endpiece between a ring and one of the at least one proximal abutment and the distal abutment of the associated endpiece, each ring being arranged around the central body of the associated endpiece, each endpiece being movable in translation relative to the ring surrounding the associated endpiece, the resilient system of one of the first and second endpieces being arranged between the distal abutment and the ring of the one of the first and second endpieces, and the resilient system of the other of the first and second endpieces being arranged between the at least one proximal abutment and the ring of the other of the first and second endpieces.

2. A ball-bearing control cable according to claim 1, wherein each row of bearing members extends between the first endpiece and the second endpiece.

3. A ball-bearing control cable according to claim 1, wherein each plate extends between the first endpiece and the second endpiece.

4. A ball-bearing control cable according to claim 1, wherein each ring has a spherical bearing surface of a ball joint.

5. A ball-bearing control cable according to claim 1, wherein each ring is arranged to surround the central body of the associated endpiece, and wherein at least one of the resilient systems includes a resilient member extending between one of the at least one proximal abutment and the distal abutment of the associated endpiece and the ring surrounding the associated endpiece.

6. A ball-bearing control cable according to claim 1, wherein each ring comprises a jaw provided with a distal stop surface and with a proximal stop surface, and each resilient system comprises an inner resilient member as well as an outer resilient member and a slide, the inner resilient member and the outer resilient member each extending from the slide in a first direction, the inner resilient member extending between the slide and one of the at least one proximal abutment and the distal abutment of the associated endpiece and the outer resilient member extending between the slide and the stop surface of the jaw of the associated endpiece.

7. A ball-bearing control cable according to claim 6, wherein:

for the first endpiece, the associated inner resilient member extends between the associated slide and the distal abutment of the first endpiece to push the slide against the proximal abutment of the first endpiece, and the associated outer resilient member extends between the slide and the distal stop surface of the jaw of the first endpiece to push the slide against the proximal stop surface of the jaw of the first endpiece; and for the second endpiece, the associated inner resilient member extends between the associated slide and the proximal abutment of the second endpiece to push the slide against the distal abutment of the second endpiece, and the associated outer resilient member extends between the slide and the at least one proximal stop surface of the jaw of the second endpiece to push the slide against the distal stop surface of the jaw of the second endpiece.

8. A ball-bearing control cable according to claim 1, wherein the central portion is flexible, each central body being rigid.

9. A ball-bearing control cable according to claim 1, wherein an intermediate segment of the central blade extends from a top face facing one of the rows of bearing members to a bottom face facing the other of the rows of bearing members, the intermediate segment having a first thickness between the bottom face and the top face, the intermediate segment extending between two end segments of the central blade, each end segment having a second thickness that is greater than the first thickness.

10. A ball-bearing control cable according to claim 9, wherein each end segment projects beyond the associated endpiece.

11. A ball-bearing control cable according to claim 1, wherein each central body comprises a hollow cylinder extending from an inside face directed towards the central blade towards an outside face, the outside face having a cross-sectional shape defined by a circle with a first diameter, at least one of the at least proximal abutment and the distal abutment having a cross-sectional shape defined by an annulus with an outer diameter, the outer diameter being greater than the first diameter.

12. A mechanical system provided with a ball-bearing control cable that is interposed between a first section and a second section of a movement transmission linkage, wherein the ball-bearing control cable in accordance with claim 1, the distal abutment of the first endpiece facing the first section and the distal abutment of the second endpiece facing the second section, the central blade being secured to the first section and to the second section.

13. A mechanical system according to claim 12, wherein neither of the first and second endpieces are in contact with the first section and the second section.

14. An aircraft, wherein the aircraft includes a mechanical system according to claim 12.

* * * * *